Patented June 11, 1940

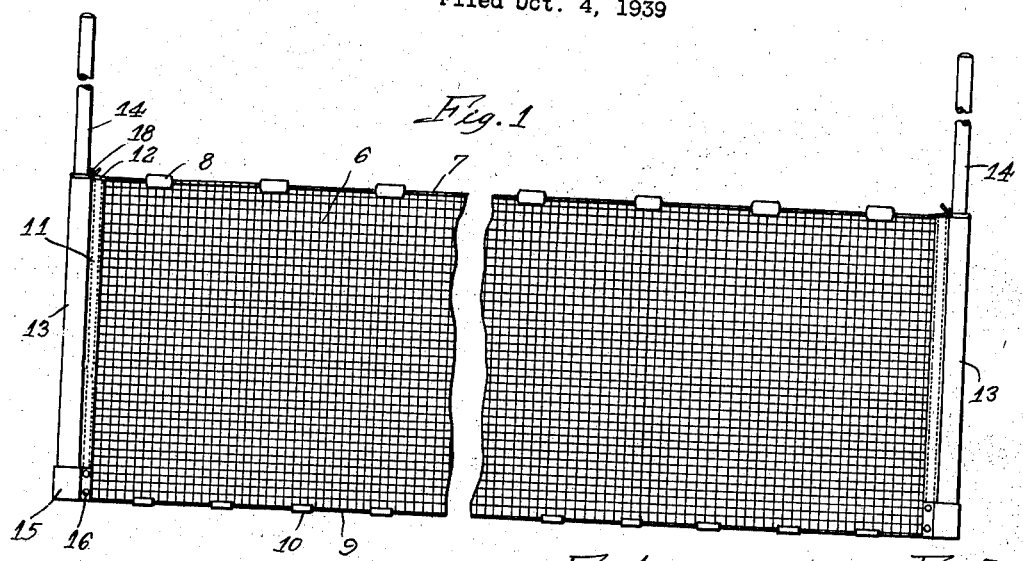
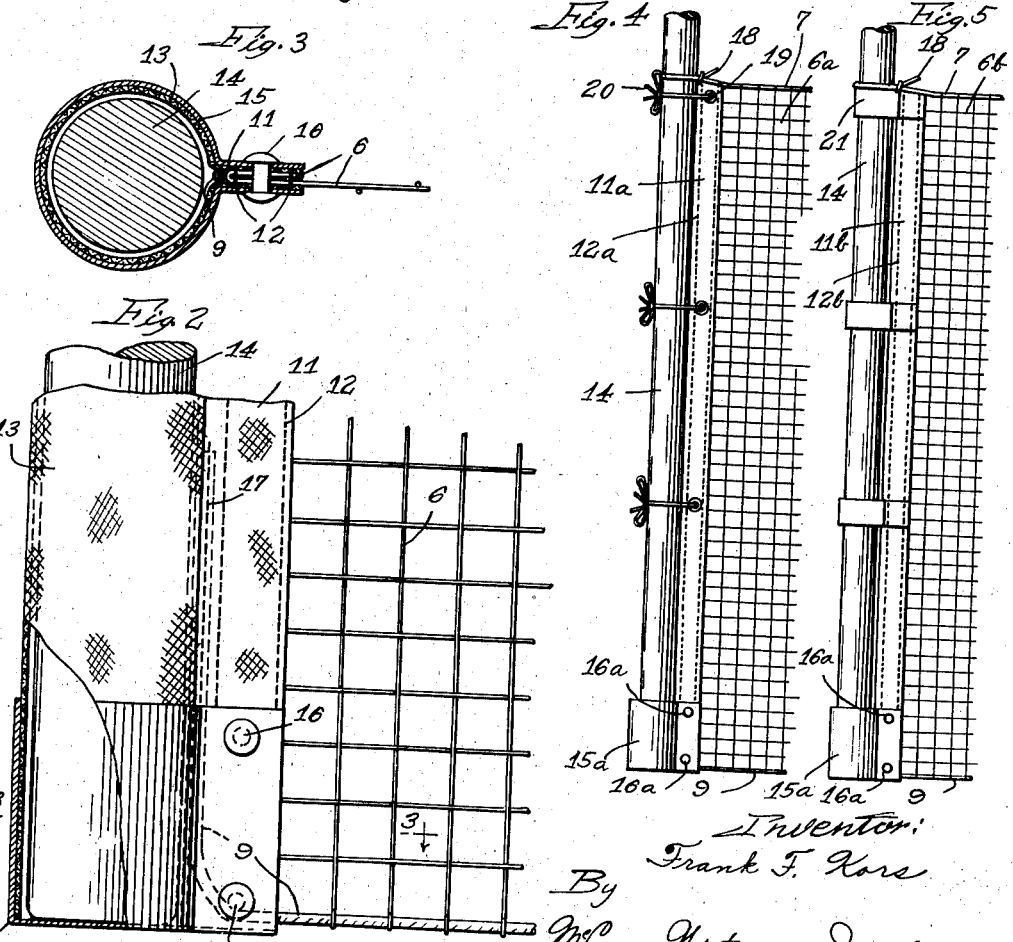

2,203,827

UNITED STATES PATENT OFFICE 2,203,827

SEINE

Frank F. Kors, Independence, Kans.

Application October 4, 1939, Serial No. 297,891

16 Claims. (Cl. 43—14)

This invention relates to fishing nets or seines; more specifically, it relates to the minnow type consisting of a net spread between two poles.

Seines have been provided with a top float line and a bottom lead line and in the past the common and probably universal practice has been to tie each end of the seine net to a pole, wrapping it around the pole and down over the lower end in order to keep the lead line down on or close to the bottom. That invariably resulted in wearing holes in the net at both ends.

It is therefore the principal object of my invention to provide a seine in which the net is equipped with novel means for attaching the ends to the poles so that the lead line will lie adjacent the bottom of the body of water without resulting in any abnormal wear being imposed upon any portion of the net.

Another object of this invention is to provide a seine which is adapted to be readily attached to and detached from the poles.

In the preferred embodiment of my invention a sleeve is provided on each end of the net to receive a pole, the same preferably having a closed reinforced bottom end so as to last as long as any other portion of the net, with ordinary care. The sleeves in addition to providing pockets for the poles extending the entire height of the net are secured in such a manner as to serve as a binding for the cut ends of the net, and the lead line is also adapted to have its ends anchored in the lower ends of the sleeves.

It will also appear from the drawing that there are other ways of accomplishing the new results of my invention by other similar constructions, all of which are to be considered as embraced within the claims that follow.

Referring now to the accompanying drawing:

Figure 1 is a fragmentary front elevation of a seine made in accordance with my invention;

Fig. 2 is an enlarged elevation of a lower corner of Fig. 1 with a portion shown in section in order better to reveal the construction;

Fig. 3 is a cross-section of Fig. 2 taken along the line 3—3;

Fig. 4 is a fragmentary elevation of a modified or alternative form of seine, and Fig. 5 is a fragmentary elevation of yet another modification.

Referring specifically to the form of my invention shown in Figs. 1 to 3, the net 6 is shown equipped with the usual float line 7 on which the floats 8 are carried, and the lead line 9 at the bottom of the said net to which the lead weights 10 are attached. Each end of the net 6 has a binding 11 in which the cut ends are sewed as at 12 to prevent ravelling. As shown here, each binding 11 is formed by the overlapping longitudinal edge portions of the adjacent sleeve 13 that is adapted to receive one of the poles 14, in accordance with my invention. Encompassing the bottom of said sleeve 13 and extending upward for a short distance thereon is the shoe or reinforcement member 15. The latter is shown here not only to cover the bottom end of sleeve 13 but also to substantially encompass the lower end of binding 11, to which it is attached by means of rivets 16 or other suitable means. As indicated in Fig. 2, the ends of the lead rope 9 are extended into and anchored in the lower ends of the sleeves 13 by stitches 17, but of course any suitable means of fastening may be used. The float line has its ends tied to the poles, as at 18.

In Fig. 4 a separate binding strip 11a is shown sewed to the end of the net by the stitches 12a and is provided at longitudinally spaced points with eyelets 19. Tie ropes 20 extending through the eyelets 19 secure the binding 11a and hence the end of the net 6a to the pole 14, the sleeves 13 being omitted in this form of seine. The shoe 15a which receives the end of the pole 14 is secured to the binding 11a substantially in the same manner as in Fig. 2, namely by rivets 16a, and the lead line 9 is adapted to be secured at its ends in the bindings 11a similarly as in Fig. 2.

In Fig. 5 the construction is substantially the same as that shown in Fig. 4 except that the tie ropes 20 are replaced by loops 21 extending around the pole 14 and secured at their ends to the binding 11b sewed, as at 12b, on the end of net 6b, the stitches 12b serving to fasten the loops, as shown.

It is believed the foregoing description gives a good understanding of the objects and advantages of my invention. The following claims have been drawn with a view to covering all legitimate modifications and adaptations.

I claim:

1. In a seine, comprising an elongated rectangular net having a float line on the upper edge thereof and a lead line on the lower edge, and upright poles for support of the opposite ends of the net, pole receiving tubular members extending along at least the lower section of said net at each end thereof and having the ends of the lead line fixed thereto.

2. In a seine, comprising an elongated rectangular net having a float line on the upper edge thereof and a lead line on the lower edge, and upright poles for support of the opposite ends of the net, pole receiving tubular members extending the full height of the net at each end thereof and having the ends of the lead line secured to the lower end portions thereof.

3. In a seine, comprising an elongated rectangular net having a float line on the upper edge thereof and a lead line on the lower edge, and upright poles for support of the opposite ends of the net, pole receiving tubular members extending along at least the lower section of said net at each end thereof and having the ends of the lead line fixed thereto, the lower ends of said tubular members being closed for abutment with the ends of said poles.

4. In a seine, comprising an elongated rectangular net having a float line on the upper edge thereof and a lead line on the lower edge, and upright poles for support of the opposite ends of the net, pole receiving tubular members extending along at least the lower section of said net at each end thereof and having the ends of the lead line fixed thereto, and reinforcing closures for the lower ends of said tubular members adapted to abut the ends of the poles.

5. A seine comprising a net, a binding along each end of said net, a sleeve member at each end of said net closed at the bottom end, each sleeve extending lengthwise of the outer edge of the adjacent binding, and a pole adapted to be entered removably in each of said sleeve members.

6. A seine comprising a net, a binding along each end of said net, a sleeve member at each end of said net, each sleeve extending lengthwise of the outer edge of the adjacent binding, a pole adapted to be entered removably in each of said sleeve members, and a combination reinforcing shoe and closure for the lower end of each of said sleeve members.

7. A seine comprising a net, a binding along each end of said net, a sleeve member at each end of said net closed at the bottom end, each sleeve extending lengthwise of the outer edge of the adjacent binding, a pole adapted to be entered removably in each of said sleeve members, and wear-resisting means on the lower ends of said sleeve members to withstand abrasive action in the use of the seine.

8. A seine comprising a net having a lead line on the lower edge thereof, a binding along each end of said net, a sleeve member at each end of said net extending lengthwise of the outer edge of the adjacent binding, a shoe member closing the lower end of each of said sleeves and reinforcing the lower ends of the sleeves and bindings, and a pole adapted to be inserted removably in each of said sleeve members, the aforesaid lead line having its ends joined to binding-sleeve-shoe assemblies adjacent the bottoms thereof.

9. A seine comprising a net, a binding along each end of said net, a shoe capable of receiving only the lower tip portion of a suitable pole on each of said bindings along the lower portions thereof, appropriate poles standing in said shoes, and tie strings securing the remainder of each of said bindings to the adjacent poles.

10. A seine comprising a net having a lead line on the bottom edge thereof, a binding along each end of said net, a shoe capable of receiving only the lower tip portion of a suitable pole on each of said bindings along the lower portions thereof, appropriate poles standing in said shoes, and tie strings securing the remainder of each of said bindings to the adjacent poles, the lead line having the ends thereof joined to the binding-shoe assemblies.

11. A seine comprising a net, a binding along each end of said net, a shoe capable of receiving only the lower tip portion of a suitable pole on each of said bindings along the lower portions thereof, appropriate poles standing in said shoes, and loops around said poles and attached to the adjacent bindings for securing the remainder of said bindings to the adjacent poles.

12. A seine comprising a net having a lead line on the bottom edge thereof, a binding along each end of said net, a shoe capable of receiving only the lower tip portion of a suitable pole on each of said bindings along the lower portions thereof, appropriate poles standing in said shoes, and loops around said poles and attached to the adjacent bindings for securing the remainder of said bindings to the adjacent poles, the lead line having the ends thereof joined to the binding-shoe assemblies.

13. As an article of manufacture a seine net having a sleeve-like member extending along each end of said net, and a lead line for the bottom edge of said net extending to the lower end portions of said sleeves and secured thereto.

14. As an article of manufacture an elongated rectangular seine net having a float line on the upper edge thereof and a lead line on the lower edge, and pole receiving tubular members extending along at least the lower section of said net at each end thereof, and having the ends of the lead line fastened to the lower end portions thereof.

15. As an article of manufacture an elongated rectangular seine net having a float line on the upper edge thereof and a lead line on the lower edge, and pole-receiving tubular members extending the full height of the net at each end thereof, and having the ends of the lead line secured to the lower end portions thereof.

16. As an article of manufacture an elongated rectangular seine net having a float line on the upper edge thereof and a lead line on the lower edge, and pole receiving tubular members extending along at least the lower section of said net at each end thereof, and having the ends of the lead line fastened thereto, the lower ends of said tubular members being closed for abutment with the ends of the poles.

FRANK F. KORS.